US006879639B1

(12) United States Patent
Verbin et al.

(10) Patent No.: US 6,879,639 B1
(45) Date of Patent: *Apr. 12, 2005

(54) DATA TRANSCEIVER WITH FILTERING AND PRECODING

(75) Inventors: Rami Verbin, Tel-Aviv (IL); Ilan Reuven, Ramat-Gan (IL); Ayelet Shahar-Doron, Modi'in (IL)

(73) Assignee: Tioga Technologies Inc., San Jose, CA (US)

( * ) Notice: Subject to any disclaimer, the term of this patent is extended or adjusted under 35 U.S.C. 154(b) by 944 days.

This patent is subject to a terminal disclaimer.

(21) Appl. No.: 09/637,797

(22) Filed: Aug. 11, 2000

Related U.S. Application Data

(63) Continuation-in-part of application No. 09/476,747, filed on Dec. 30, 1999, now Pat. No. 6,411,657.
(60) Provisional application No. 60/197,028, filed on Apr. 13, 2000.

(51) Int. Cl.[7] .................................................. H04L 1/00
(52) U.S. Cl. ...................................... 375/285; 375/296
(58) Field of Search ................................. 375/285, 296, 375/348, 350; 348/608, 613

(56) References Cited

U.S. PATENT DOCUMENTS

| | | | | |
|---|---|---|---|---|
| 5,249,200 | A | | 9/1993 | Chen et al. ..................... 375/58 |
| 5,293,402 | A | | 3/1994 | Crespo et al. .................. 375/14 |
| 5,602,602 | A | | 2/1997 | Hulyalkar .................... 348/607 |
| 5,878,086 | A | | 3/1999 | Hulyalkar .................... 375/285 |
| 5,881,108 | A | | 3/1999 | Herzberg et al. ........... 375/296 |
| 5,881,363 | A | | 3/1999 | Ghosh et al. ................. 455/5.1 |
| 6,167,082 | A | | 12/2000 | Ling et al. |
| 6,400,761 | B1 | * | 6/2002 | Smee et al. .................. 375/232 |
| 2002/0044598 | A1 | * | 4/2002 | Frenkel et al. ............... 375/232 |
| 2003/0223505 | A1 | * | 12/2003 | Verbin et al. ................ 375/261 |
| 2004/0028148 | A1 | * | 2/2004 | Dowling ...................... 375/296 |

FOREIGN PATENT DOCUMENTS

| | | | |
|---|---|---|---|
| WO | WO 98/12824 | 3/1998 | ............ H04B/3/23 |
| WO | WO 98/36493 | 8/1998 | ............ H03K/5/01 |
| WO | WO 98/48545 | 10/1998 | ........... H04L/27/01 |

OTHER PUBLICATIONS

U.S. Appl. No.: 09/521,495, filed Mar. 9, 2000, entitled "Decision Feedback Analyzer With Filter Compensation".
Gitlin, et al. "Data Communications Principles", Plenum Press, New York, 1992, pp. 334–347, 500–513, 585–590.
Wei, "Generalized Square and Hexagonal Constellations for Intersymbol Interference Channels with Generalized Tomlinson–Harashima Precoders", IEEE Transactions on Communications, 42:9 (Sep. 1994), pp. 2713–2721.

(Continued)

Primary Examiner—Amanda T. Le
(74) Attorney, Agent, or Firm—Abelman, Frayne & Schwab

(57) ABSTRACT

A method for conveying digital data from a transmitter to a receiver includes specifying a spectral filtering profile to be applied in conveying the data. A sequence of input symbols is generated at the transmitter, corresponding to the data to be conveyed. The input symbols are precoded at the transmitter using Tomlinson-Harashima preceding responsive to the specified profile, so as to generate a corresponding sequence of precoded symbols. The precoded symbols are filtered in accordance with the specified profile. The precoded and filtered symbols are decoded at the receiver so as to recover the data therefrom.

59 Claims, 2 Drawing Sheets

OTHER PUBLICATIONS

Crespo, "Pole–Zero Decision Feedback Analyzer with a Rapidly Converging Adaptive IIR Algorithm", IEEE Journal on Selected Areas in Communications, 9(6), Aug. 1991, pp. 817–828.

Haykin, "Adaptive Filter Theory", Chapter 9, "Least–Mean–Square Algorithm", $3^{rd}$ Edition, Prentice–Hall, 1996, pp. 365–372.

"The Business Case for VDSL: A White Paper", Orckit Communications, Apr. 1999, pp. 1–16.

Cioffi, J. (T1E1.4 VDSL Editor), "Very–high–speed Digital Subscriber Lines System Requirements", T1E1.4/98–043R6, Plano, Texas, Nov. 1998, pp. 1–2.

Foster K. et al. "Transmission and Multiplexing™"; Access Transmission Systems on Metallic access cables; Very high speed Digital Subscriber Line (VDSL), Sec. 9.3, TS 101 270–1 V1.1.5, 1999, p. 36.

http://www.orckit.com, "What is VDSL?" Orckit Communications–DSL FAQ3, Nov. 1999, p. 1.

http://www.orckit.com/qam.html, DSL Knowledge Center–QAM: the Choice for VDSL Transmission Line Code, by Ehud Rokach, 1998, pp. 1–2.

* cited by examiner

DATA TRANSCEIVER WITH FILTERING AND PRECODING

CROSS-REFERENCE TO RELATED APPLICATIONS

This application is a continuation-in-part of U.S. patent application Ser. No. 09/476,747, filed Dec. 30, 1999, now U.S. Pat. No. 6,411,657, and claims the benefit of U.S. Provisional Patent Application No. 60/197,028, filed Apr. 13, 2000. Both of these applications are incorporated herein by reference.

FIELD OF THE INVENTION

The present invention relates generally to high-speed data communications, and specifically to transmission of Very High Rate Digital Subscriber Line (VDSL) signals.

BACKGROUND OF THE INVENTION

Digital Subscriber Line (DSL) is a modem technology that enables broadband digital data to be transmitted over twisted-pair wire. DSL modems allow users to access digital networks at speeds tens to hundreds of times faster than current analog modems and basic ISDN service. A range of DSL standards has been defined, known generically as "xDSL," wherein the various standards have different data rates and other associated features but share common principles of operation. VDSL (Very High Rate Digital Subscriber Line) is the next-generation technology in the DSL family, offering data rates up to 52 Mbit/s over short runs.

DSL modems transmit data that has been line coded (i.e., modulated) in accordance with either a single-carrier or a multi-carrier modulation scheme. Single-carrier schemes for VDSL include Quadrature Amplitude Modulation (QAM) and Carrierless Amplitude Modulation (CAP). These schemes are described, for example, by Gitlin et al., in *Data Communications Principles* (Plenum Press, New York, 1992), pp. 334–347, which is incorporated herein by reference. In QAM, input data values are mapped for transmission to a sequence of symbols, each having a certain amplitude and phase. Each symbol can be represented by a complex number, which is a point in a two-dimensional "constellation" of symbols. Data for VDSL transmission may be coded before modulation, using any of a variety of suitable coding schemes known in the art, or may alternatively be uncoded.

DSL transmission channels are often subject to severe inter-symbol interference, due to amplitude distortion in the frequency domain. The accepted solution to this problem is to use a decision feedback equalizer (DFE) in the receiver, in order to cancel interference from past signals. One of the problems caused by such a DFE is error propagation, since once an error has been introduced into one of the samples, the DFE will "remember" the error over many subsequent samples.

If the channel impulse response is known, a suitable Tomlinson-Harashima precoder can be used in the transmitter, and can eliminate the need for the DFE in the receiver. Precoders of this sort are described by Wei, in an article entitled, "Generalized Square and Hexagonal Constellations for Intersymbol-Interference Channels with Generalized Tomlinson-Harashima Precoders," published in *IEEE Transactions on Communications*, 42:9 (September, 1994), pp. 2713–2721, which is incorporated herein by reference. The precoder in this context is intended to compensate for interference in a channel having an equivalent discrete-time response expressed as $$1 + \sum_{i=1}^{k} h_i Z^{-i}.$$

The Tomlinson-Harashima precoder comprises a two-dimensional modulo device with a negative feedback loop. The modulo device takes each complex input symbol that it receives, r, into an output symbol s given by:

$$s_i = r_i - k_i \cdot 2L \tag{1}$$

wherein i=1, 2, giving the real and imaginary parts of s and r; 2L is the modulo value; and $k_i$ is an integer such that $-L \leq s_i < L$. In the feedback loop, the symbols output by the modulo device are filtered by a digital filter having a discrete time response based on the equivalent discrete-time response of the channel, without the zero-order time-domain component. In other words, the filter response in the feedback loop is given by $$\sum_{i=1}^{k} h_i Z^{-i}.$$

The filtered feedback symbols are subtracted from the modulated symbols (whether coded or uncoded) that are input to the precoder for transmission.

In the receiver, the channel-distorted symbols are input to a modulo device, which is identical to that in the precoder. Assuming that the equalizer's response is well-matched to the actual response of the channel, the symbols output by the modulo device in the receiver will be identical, to within the white Gaussian noise added by the channel, to the modulated symbols that were input to the precoder for transmission. The output symbols can then be processed by a decision device or Viterbi decoder, as appropriate, to recover the input data.

U.S. Pat. No. 5,249,200, to Chen et al., whose disclosure is incorporated herein by reference, describes a device and method for combining precoding with symbol-rate spectral shaping. A data transmitter, which transmits signals to a receiver over a transmission channel, includes a Tomlinson preceding unit and a spectral shaping unit. The equivalent channel response is determined and conveyed to the preceding and shaping units, which adjust the spectral properties of the transmitted signals in accordance with the determined channel response. The preceding and shaping units may also be used independently of one another.

A further difficulty in transmitting data over twisted pair at DSL rates is that a substantial amount of radio-frequency (RF) radiation is inevitably emitted. It has been found that this emission can cause serious interference with amateur radio transmissions, particularly in the HF range. For this reason, emerging technical specifications for VDSL place strict upper limits on the radiation levels that VDSL systems are allowed to generate in HF bands that are set aside for amateur radio, such as 1.81–2.0 MHz, 3.5–4.0 MHz and other, higher-frequency bands. To meet these requirements, system designers typically add notch filters in the output circuits of their modems to attenuate signals in the forbidden frequency ranges. Such notch filters complicate the design not only of VDSL transmitters, but also of receivers. The VDSL receiver must compensate not only for distortion by the communication channel, but also for the distortion introduced in the transmitter output itself by the notch filters.

The conventional solution to this problem is to use in the receiver an adaptive equalizer comprising a Decision Feedback Equalizer (DFE) and a Forward Filter Equalizer—FFE. As a rule, both the DFE and FFE comprise finite impulse response (FIR) filters, typically having a relatively large number of taps with large coefficients. Decision feedback equalization is described, for example, in the above-mentioned book by Gitlin et al., incorporated herein by reference, pp. 500–513. The long DFE, with many large coefficients, is undesirable for a number of reasons, including:

Uncertain convergence—conventional equalization schemes may converge very slowly or may not converge at all.

Error propagation—the longer the DFE, the longer will be the error bursts due to error propagation. This problem is exacerbated by the presence of a notch filter, which tends to increase the magnitude of the DFE coefficients.

The equalizer might not converge to its optimal values, resulting in a performance loss, typically of ~1 dB. Advanced adaptation methods may decrease this performance loss, but at the cost of significant additional complexity.

SUMMARY OF THE INVENTION

It is an object of some aspects of the present invention to provide an improved high-speed data modem.

It is a further object of some aspects of the present invention to provide methods and apparatus that enable enhanced equalization of spectrally-shaped signals.

In preferred embodiments of the present invention, a high-speed data transmitter transmits signals, based on a stream of input symbols, over a communication channel to a receiver. A specified spectral shaping function is applied to the signals, by either a digital transmit (Tx) filter or a digital receive (Rx) filter, or a combination of the two. The spectral shaping typically includes one or more notches, such as are required for eliminating radio-frequency interference (RFI) due to the transmitter in specified, forbidden frequency bands, or to eliminate RFI from external sources that reaches the receiver.

The transmitter comprises a Tomlinson-Harashima precoder, which precodes the symbols to be transmitted before they are digitally filtered. The precoder comprises a modulo device, as described hereinabove, and a feedback filter having a response that is based on the combined response of the Tx and/or Rx filter, less a zero-order time-domain component of the filter response. Preferably, for efficient implementation of the notch profile, the Tx and/or Rx filter comprises an infinite impulse response filter (IIR), and the feedback filter of the precoder similarly comprises an IIR. As a result of the preceding and digital filtering, the symbols reaching the receiver have an expanded output constellation (relative to the input constellation), with a frequency spectrum in accordance with the specified profile.

The receiver comprises a decision block and a modulo reduction device. The decision block preferably comprises a Forward Filter Equalizer (FFE) and a Decision Feedback Equalizer (DFE), together with a decision device. Since distortion due to the notch filtering (or other digital filter response applied to the signal) is substantially eliminated by the use of the Tomlinson-Harashima precoder, the FFE and DFE generally must compensate only for channel distortion. Preferably, the FFE and DFE coefficients are determined adaptively, during transmission of an initial test signal from the transmitter to the receiver. The decision device processes the equalized signals to generate symbols having a restored constellation. When the feedback filter of the precoder is based on the Tx filter response, the restored constellation is substantially the same as the expanded output constellation of the transmitter after filtering with the digital filter response. The modulo reduction device simply takes a modulo of each of the restored symbols in order to recover the original input symbols.

In some preferred embodiments of the present invention, the Rx and Tx filter coefficients are communicated between the Rx and Tx sides of a modem. This information is useful in setting both sides (Rx and Tx) for optimal operation.

In some preferred embodiments of the present invention, in which the feedback filter response is based at least in part on the Rx filter, the receiver communicates its filter coefficients to the transmitter in a preliminary phase of communications. Preferably, at the initiation of communications between the transmitter and the receiver, the fixed Tx and Rx filters and the precoder are disabled. The receiver equalizer coefficients are allowed to converge adaptively under these conditions, whereupon the DFE coefficients are conveyed back to the transmitter for implementation by the feedback filter. When this operation is completed, the Tx and Rx filters and the precoder are activated, whereupon the precoder compensates for both the fixed filters and for the variable channel response.

Alternatively, the fixed filters and precoder are activated immediately upon initiation of communications. The receiver equalizer coefficients are allowed to converge adaptively under these conditions. The DFE coefficients are preferably conveyed back to the transmitter, for implementation in the feedback filter of the precoder, and the DFE is then deactivated. Further alternatively, only one of the fixed Tx and Rx filters is activated initially, together with corresponding feedback in the precoder, and the other is activated subsequently, after adaptation. Still further alternatively, the feedback filter of the precoder is based on only a selected part of the response of the Tx and/or Rx filters. Other variations will be apparent to those skilled in the art.

In one of these preferred embodiments, only some of the DFE coefficients, preferably the largest of the coefficients, are passed from the receiver to the feedback filter in the transmitter. The DFE continues to operate in the receiver, with coefficients that are modified so that the overall equalization of the received signal is substantially the same as it was before the coefficients were passed to the transmitter.

Thus, in preferred embodiments of the present invention, the Tomlinson-Harashima precoder is used in a novel fashion, to efficiently precode a signal that is subject to known filtering elements. As a result of this precoding, there is no need for the DFE in the receiver to compensate for the effects of the notch filters or other shaping that must be imposed on the spectrum. In those preferred embodiments in which the DFE is turned off entirely, the modulo devices in the transmitter and the receiver work in concord to eliminate the deleterious effects of both the filter and the channel.

Transmitters and receivers in accordance with preferred embodiments of the present invention thus have the following advantages:

Lower sensitivity to error propagation, since the most dispersive elements in the transmission are precoded.

Lower complexity, taking advantage of the known characteristics of the fixed filters. The precoder (like the notch filter) can thus be implemented with a very efficient IIR scheme, whereas precoder schemes normally require FIR schemes with much greater complexity.

Better and easier convergence of the DFE, since the fixed filters are precoded, and the DFE does not need to take their effect on the total channel response into account.

No need to add taps to the DFE due to the Tx and/or Rx filtering. The result is lower sensitivity to error propagation, in addition to the enhanced convergence of the equalizer.

Simplified pulse shaping (when only the Tx filter is precoded). In most VDSL transmitters, the output of the Tx filter is passed to a pulse shaping filter (typically a square root raised cosine filter). Because the Tx filter output includes the extended constellation points (which is not the case when a conventional Tomlinson-Harashima precoder is used), this output can be represented using only a small number of bits per symbol. Therefore, the pulse shaping filter can be implemented in a very efficient way, using multipliers with a small number of bits. This advantage is significant, since the pulse shaping filter is typically a long FIR filter.

Adaptivity in the mixed precoder-DFE scheme. The precoder can be used to correct for the fixed parts of the total channel response, i.e. for the digital filters at the Rx and Tx sides. The DFE in this case will correct only the time varying elements of the channel. This configuration solves the adaptation problem of conventional precoders, which are typically used without a DFE.

The present invention is applicable particularly to next-generation, ultra-high speed transmission systems, such as VDSL and standards under development by the HPNA (Home Phone Networking Association). It may, however, be adapted for use in substantially any transmitter/receiver pair that communicate by single-carrier modulation, whether using baseband or passband signal modulation schemes. While preferred embodiments are described herein mainly with reference to notch filtering, a wide range of other digital filter types may be used in the context of the present invention, including both infinite impulse response (IIR) and finite impulse response (FIR) types. The Tomlinson-Harashima precoder and filter of the present invention may also be used in conjunction with an adaptive digital filter for the purpose of "water filling," i.e., to shape the output power spectral density of a transmitter to optimally match the spectral characteristics of the communication channel.

There is therefore provided, in accordance with a preferred embodiment of the present invention, a method for conveying digital data from a transmitter to a receiver, including:

specifying a spectral filtering profile to be applied in conveying the data;

generating a sequence of input symbols at the transmitter corresponding to the data to be conveyed;

precoding the input symbols at the transmitter using Tomlinson-Harashima precoding responsive to the specified profile, so as to generate a corresponding sequence of precoded symbols;

filtering the precoded symbols in accordance with the specified profile; and decoding the precoded and filtered symbols at the receiver so as to recover the data therefrom.

Preferably, specifying the spectral filtering profile includes specifying a notch filter to be applied to the precoded symbols. Typically, filtering the precoded symbols includes attenuating radio-frequency signals transmitted by the transmitter in a predetermined frequency band, so as to avoid generating radio frequency interference in that band. Alternatively or additionally, filtering the precoded symbols includes attenuating radio-frequency signals received by the receiver in a predetermined frequency band, so as to reject radio frequency interference received in that band.

In a preferred embodiment, filtering the precoded symbols includes applying an infinite impulse response filter to the symbols.

Preferably, filtering the precoded symbols includes filtering the symbols at the transmitter. Most preferably, filtering the symbols includes filtering the symbols based on predetermined filtering parameters, and the method includes communicating the parameters from the transmitter to the receiver for use in processing the symbols at the receiver.

Alternatively or additionally, filtering the precoded symbols includes filtering the symbols at the receiver. Preferably, filtering the symbols includes filtering the symbols based on predetermined filtering parameters, and the method includes communicating the parameters from the receiver to the transmitter for use in preceding the input symbols.

Preferably, generating the sequence of input signals includes generating the sequence with a given input constellation, and filtering the precoded symbols includes generating output symbols having an output constellation that is expanded relative to the input constellation. Preferably, preceding the input symbols includes applying the Tomlinson-Harashima precoding such that each of the input symbols can be recovered by taking a modulo of a corresponding one of the output symbols. Further preferably, generating the sequence of input symbols includes generating symbols having real and imaginary parts, and precoding the input symbols includes preceding both the real and imaginary parts of the input symbols such that both the real and imaginary parts can be recovered by taking a two-dimensional modulo of the real and imaginary parts of the corresponding output symbols. In a preferred embodiment, generating the sequence of input symbols includes generating Quadrature Amplitude Modulation (QAM) symbols.

Typically, the precoded symbols are conveyed from the transmitter to the receiver over a channel having given a channel response, and specifying the spectral profile includes specifying at least a portion of the profile substantially independently of the channel response. Preferably, filtering the precoded symbols further includes optimizing a power spectral density of the conveyed precoded symbols responsive to the channel response. Most preferably, the method includes determining the channel response, and preceding the input symbols includes using the Tomlinson-Harashima preceding responsive to the channel response, as well as to the specified profile.

Preferably, preceding the input symbols includes:

filtering the sequence of precoded symbols by applying a feedback filter response thereto, so as to generate a corresponding sequence of feedback symbols, wherein the feedback filter response is substantially equal to the filtering profile less a zero-order time-domain component of the profile;

subtracting the feedback symbols from the corresponding input symbols, so as to generate a corresponding sequence of subtracted symbols; and mapping the subtracted symbols to the corresponding precoded symbols, such that each of the subtracted symbols in the sequence can be recovered by taking a modulo of the corresponding precoded symbol.

Preferably, specifying the spectral filtering profile includes specifying a filter response given in the z-domain by $A(z)/B(z)$, A and B complex polynomials, wherein the precoded symbols are conveyed from the transmitter to the receiver over a channel having a channel response H(z), and wherein applying the feedback filter comprises applying a filter with a response F(z) given substantially by F(z)=[(1+ $Z^{-1}$·DFEh(z))·A(z)−B(z)]/B(z), wherein DFEh(z) is an equalizer response of- a decision feedback equalizer that is suitable to compensate for the channel response at the receiver. Most preferably, decoding the symbols includes adaptively determining the response DFEh(z) at the receiver, and applying the filter with the response F(z) includes conveying an indication of the determined response DFEh (z) to the transmitter for application by the feedback filter.

In a preferred embodiment, generating the sequence of input symbols includes generating Quadrature Amplitude Modulation (QAM) symbols, having respective real and imaginary parts, and mapping the subtracted symbols includes mapping both real and imaginary parts of the subtracted symbols. Typically, the transmitter transmits Very High Rate Digital Subscriber Line (VDSL) signals to the receiver based on the sequence of precoded symbols.

Preferably, decoding the symbols at the receiver includes taking a modulo of each of the symbols so as to recover the corresponding input symbol. Typically, the receiver receives the symbols from the transmitter over a channel having a channel response, and decoding the symbols includes applying a digital equalizer to the symbols so as to compensate for the channel response.

Preferably, applying the digital equalizer includes adaptively determining equalization coefficients for application by the equalizer responsive to the channel response. Further preferably, the method includes conveying an indication of the adaptively-determined coefficients to the transmitter, and precoding the input symbols includes adjusting the Tomlinson-Harashima precoding responsive to the indication, and decoding the symbols includes substantially deactivating the digital equalizer after adjusting the precoding. Preferably, determining the equalization coefficients includes refraining from filtering the precoded symbols while determining the coefficients. Alternatively or additionally, the equalization coefficients are determined while precoding the symbols. In a preferred embodiment, adaptively determining the equalization coefficients comprises finding a distribution of the output constellation and adapting the coefficients responsive to the distribution.

Typically, applying the digital equalizer includes applying a forward equalizer and a digital feedback equalizer.

There is also provided, in accordance with a preferred embodiment of the present invention, a high-speed data transmitter, including:

a Tomlinson-Harashima precoder, which is adapted to receive and precode a sequence of input symbols responsive to a specified spectral filtering profile, so as to generate a corresponding sequence of precoded symbols; and transmit circuitry, which is adapted to process the precoded symbols so as to generate an output signal for transmission over a communication channel to a receiver.

Preferably, the specified spectral filtering profile includes a notch filter response, and the transmit circuitry includes a digital filter, which is adapted to filter the precoded symbols responsive to the notch filter response.

Preferably, the precoder includes:

a feedback digital filter, which is adapted to apply a feedback filter response, based on the specified spectral filtering profile, to the sequence of precoded symbols so as to generate a corresponding sequence of feedback symbols;

a subtractor, adapted to subtract the feedback symbols from the corresponding input symbols, so as to generate a corresponding sequence of subtracted symbols; and a modulo mapping device, adapted to map the subtracted symbols to the corresponding precoded symbols, such that each of the subtracted symbols in the sequence can be recovered by taking a modulo of the corresponding precoded symbol.

There is additionally provided, in accordance with a preferred embodiment of the present invention, apparatus for high-speed data transmission, including:

a transmitter, which includes:

a Tomlinson-Harashima precoder, which is adapted to receive and precode a sequence of input symbols responsive to a specified spectral filtering profile, so as to generate a corresponding sequence of precoded symbols; and transmit circuitry, which is adapted to process the precoded symbols so as to generate an output signal for transmission over a communication channel; and a receiver, adapted to receive the output signal from the transmitter over the channel, and including:

receive circuitry, which is adapted to process the received output signal, so as to generate a stream of output samples;

a decision block, adapted to process the stream of output samples so as to recover a sequence of output symbols; and a modulo reduction device, adapted to take a modulo of each of the recovered output symbols so as to regenerate the input symbols.

Preferably, at least one of the transmit circuitry and the receive circuitry includes a digital filter, which is adapted to apply the specified filtering profile to the signal. In a preferred embodiment, the digital filter includes a transmit digital filter in the transmit circuitry and a receive digital filter in the receive circuitry, which are together adapted to apply the specified filtering profile.

Preferably, the decision block includes:

a decision feedback equalizer, which is configured to apply decision feedback filtering to the recovered sequence of output symbols, so as to generate a corresponding sequence of decision feedback symbols;

a forward filter equalizer, which is configured to apply forward equalization to the stream of output samples so as to generate a sequence of forward-equalized symbols;

an adder, adapted to add the decision feedback symbols to the forward-equalized symbols to generate a corresponding sequence of corrected symbols; and an extended slicer, adapted to assign each of the corrected symbols to a corresponding value in a constellation of the output symbols.

Preferably, the decision feedback equalizer includes an adaptive equalizer, having equalization coefficients determined adaptively responsive to the channel response.

The present invention will be more fully understood from the following detailed description of the preferred embodiments thereof, taken together with the drawings in which:

DETAILED DESCRIPTION OF PREFERRED EMBODIMENTS

Figure 1:
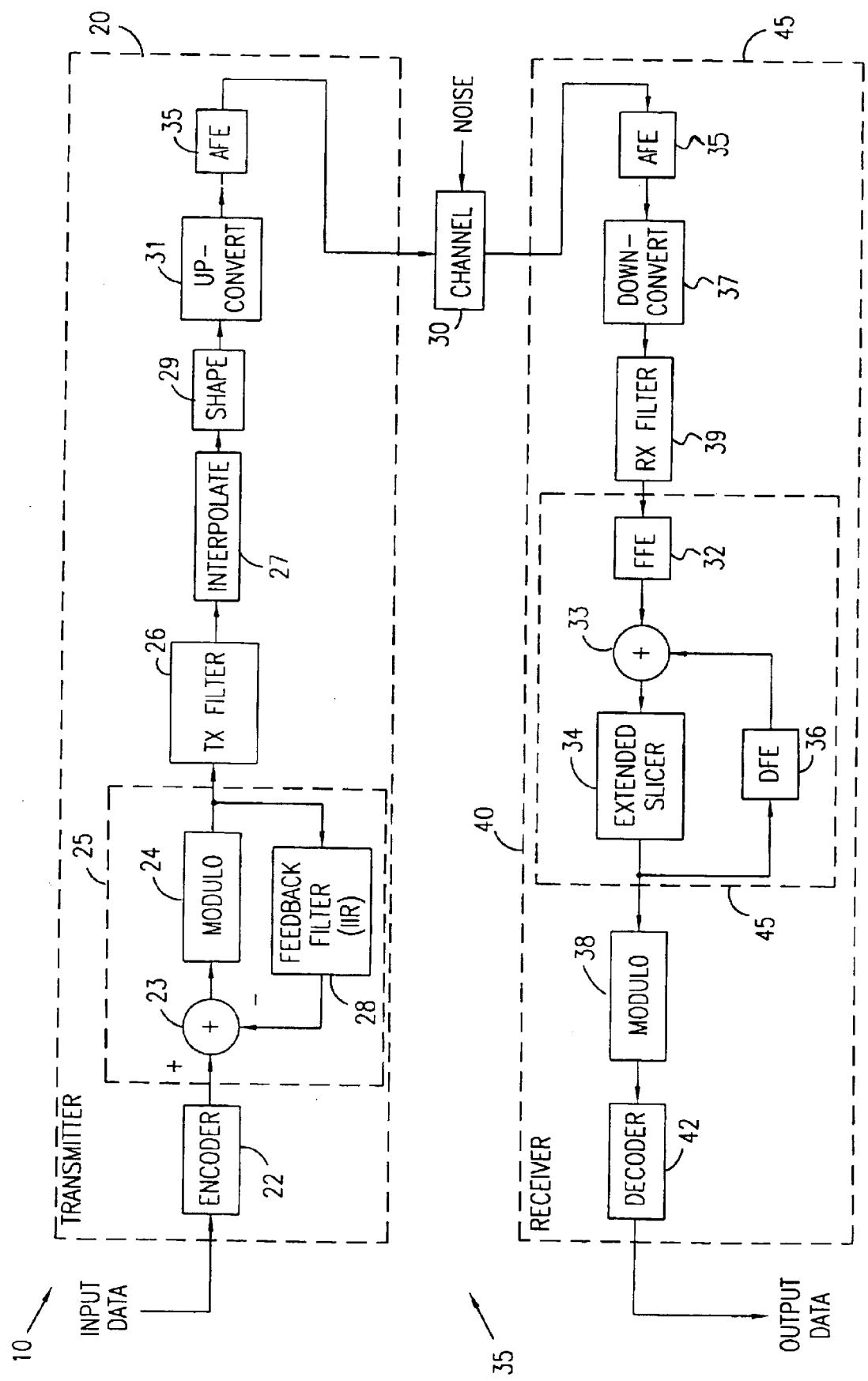
FIG. 1 is a block diagram that schematically illustrates a high-speed data transmitter and receiver, in accordance with a preferred embodiment of the present invention.

FIG. 1 is a block diagram that schematically illustrates a system 10 for high-speed data communications, in accordance with a preferred embodiment of the present invention. The system comprises a transmitter 20 and a receiver 40, linked by a communication channel 30. Preferably, system 10 is a VDSL system, although the principles embodied in the system are similarly applicable to communications in accordance with other standards.

Transmitter 20 comprises a data encoder 22, which receives a stream of digital input data samples from a data source, and generates a corresponding sequence of QAM symbols. Encoder 22 may apply substantially any suitable modulation scheme known in the art, including both coded and uncoded schemes.

The symbols generated by encoder 22 are input to a Tomlinson-Harashima precoder 25, which precodes the symbols. Precoder 25 comprises a modulo device 24 and a feedback filter 28. The modulo device preferably operates generally as described in the above-mentioned article by Wei. For square constellations (typical when an even number of bits is used) the modulo operation can be performed separately on the real and imaginary parts of the signal. Preferably, for each input symbol $a_n$, having real and imaginary parts, $a_n^{(1)}$ and $a_n^{(2)}$ respectively, the modulo device generates an output symbol $x_n$ having real and imaginary parts $x_n^{(1)}$ and $x_n^{(2)}$ given by:

$$x_n^{(i)} = a_n^{(i)} \pm b_n^{(i)} \cdot 2M \qquad (2)$$

Here $b_n^{(i)}$ (i=1,2) is a integer number chosen such that $x_n^{(i)}$ is limited to the range (−M,M). For 64 QAM, for example, M=8. Alternatively, other values of M may be chosen, and different constellation shapes may be used, as described by Wei, for example. Feedback filter 28 applies a feedback filter response, as described in detail hereinbelow, to the symbols output by modulo device 24. Filter 28 is connected to modulo device 24 in a negative feedback loop by an adder 23.

The precoded symbols are preferably filtered by a transmit (Tx) digital filter 26, operating in cooperation with precoder 25. As a result of the preceding, the constellation of the symbols output from filter 26 is preferably expanded relative to the input constellation generated by encoder 22. An exemplary expanded constellation of this sort is shown and described in the above-mentioned U.S. patent application Ser. No. 09/476,747. This example applies to a case in which feedback filter 28 is based only on Tx filter 26, and different constellations will be encountered when preceding for other elements of system 10.

Following precoder 25, transmitter 20 includes further processing and output circuits, as are known in the art. Preferably, an interpolator 27 is used to up-sample the symbol stream, and a shaper (or shaping filter) 29 applies square root raised-cosine shaping to the filtered symbols, for the purpose of reducing inter-symbol interference. Further preferably, the shaper applies a power spectral density (PSD) mask filter to the symbols. The shaped signals are passed to an up-converter 31, and from there to analog front end (AFE) circuitry 35.

The output symbols generated by transmitter 20 are conveyed as an electrical signal by channel 30, which typically comprises a twisted-pair connection, to receiver 40. The channel adds noise and distortion to the signal, as is known in the art. Signals received by receiver 40 are processed, digitized and down-converted by analog front end 35 and by a down-converter 37. Optionally, the digitized signals are filtered by a receive (Rx) digital filter 39. The signals are then passed as a sequence of digital samples to an equalization and decision block 45. This block typically includes a forward filter equalizer (FFE) 32 and a decision feedback equalizer (DFE) 36.

FFE 32 and DFE 36 preferably comprise multi-tap filters, having coefficients that are determined adaptively to compensate for the effects of channel 30, as is known in the art. To the extent that the precoding applied by precoder 25 compensates for the effects of digital filters 26, 29 and 39, however, there is almost no need for equalizers 32 and 36 to compensate for distortion due to these filters. (The equalizers may still adaptively apply a small correction for the filter effects.) Consequently, DFE 36 in receiver 40 typically can have fewer taps and be of simpler design, with less concern for problems of error propagation, than in VDSL receivers that are known in the art. It is desirable, however, that FFE 32 include a sufficient number of taps so as to substantially reduce the energy level of precursors in the received signals. Generally, a FFE that is designed to deal adequately with the response of channel 30 alone (without the effect of TX filter 26 and Rx filter 39) will be able to deal satisfactorily with the precursor level. As described hereinbelow, after DFE 36 has adapted to compensate for the channel effects, its coefficients are preferably transferred to precoder 25, and the DFE is deactivated.

Samples output by FFE 32 and DFE 36 (when it is active) are summed by an adder 33 and are then processed by an extended slicer 34. The slicer takes real and imaginary parts of each sample and assigns the sample to a corresponding point in the expanded constellation, so as to recover the symbols that were output by transmitter 20. It is termed an "extended slicer" since it must deal with the expanded constellation, but otherwise it is substantially similar in design and function to slicers known in the art. A modulo reduction device 38, substantially similar to device 24, applies a modulo operation, as described in equation (2) above, to each of the recovered symbols, and thus generates a sequence of QAM symbols in the original input constellation. These symbols are processed by a decoder 42 to generate an output stream of digital data, reproducing the data that were input to transmitter 20.

Typically, a first stage of the transmitter, including precoder 25 and digital filter 26, operates at the transmitter symbol rate, while a second stage, including shaper 29 and up-converter 31, for example, operates at twice the symbol rate. (Interpolator 27 performs the required up-sampling between the first and second stages.) The precoder preferably compensates for the first stage, i.e., for the filtering that is implemented in the symbol rate clock. The advantage of this implementation is that the output of this stage into the second stage includes extended constellation data, as described in the above-mentioned U.S. patent application Ser. No. 09/476,747, which requires only small number of bits. This quality allows efficient implementation of the second stage. Alternatively, the precoder may be used to compensate for the filters in both the first stage and the second stage, as well as for the effects of channel 30 and/or filtering in receiver 40.

Preferably, precoder 25 functions cooperatively with Tx filter 26 and/or Rx filter 39 to impose a notch filter on the transmitted signals. The notch filter is typically designed to attenuate the spectral power of the output of transmitter 20 in certain spectral bands, such as HF amateur radio bands, in which radio frequency (RF) emission from system 10 may cause interference. Alternatively or additionally, the notch filter is adapted to attenuate RF interference (RFI) reaching receiver 40 from ambient sources, such as radio transmissions, originating outside system 10. Filters 26 and 39 can also include a combination of filters of this type so as to create a wider notch or multiple notches at different frequencies. Further alternatively or additionally, the combination of the precoder and one or more of the filters may be adapted to perform other filtering and spectral shaping functions.

Based on digital filters 26 and/or 39, and optionally on shaper 29, a combined filter response is determined for application by precoder 25. This combined response may take into account the total effects of the filters or, alternatively, only a selected part of the effects. Typically, shaper 29 and Rx filter 39 operate at different clock frequencies from precoder 25 and Tx filter 26. Therefore, some mathematical manipulation is required in order to make the precoder compensate, in whole or in part, for the effects of the shaper and Rx filter, as will be apparent to those skilled in the art. Alternatively, this compensation may be achieved by allowing DFE 36 to converge, and then passing the DFE coefficients to the precoder, as described hereinbelow.

In the description that follows, the filter response that is compensated for by precoder 25 is referred to as a notch filter response, given in the z-transform domain as NF(z). It will be understood, however, that the principles embodied in the description are equally applicable to filters of other types. In the most general terms, the notch response can be expressed as an IIR:

$$NF(z) = \frac{A(z)}{B(z)} \quad (3)$$

wherein A and B are arbitrary complex polynomials.

The response of feedback filter 28 in precoder 25 that is needed to compensate for this notch filtering is NF(z)−1. While precoder 25 is operative, DFE 36 needs to compensate only for the effective response of channel 30, which includes the channel itself, together with FFE 32 and other parts of system 10, possibly including elements of the Tx and/or Rx filters, that are not handled by precoder 25. Assuming the causal part of the effective channel response to be H(z) when sampled at the symbol rate, the coefficients of DFE 36 will converge to a response DFEh given by:

$$DFEh(z) = (H(z)-1) \cdot z \quad (4)$$

Precoder 25 may also be used to compensate for the channel response H(z), in addition to the notch filter response NF(z). In this case, the response F(z) of feedback filter 28 is given by substitution from equations (3) and (4) as:

$$F(z) = H(z) \cdot NF(z) - 1 \quad (5)$$
$$= \frac{(1+z^{-1} \cdot DFEh(z)) \cdot A(z) - B(z)}{B(z)}$$

A(z) and B(z) are known in advance, since they are determined by elements of the transmitter or communicated from the receiver to the transmitter upon initiation of communications. DFEh(z) is preferably determined simply by running system 10 using a test signal while filters 26, 29 and 39 are at least partially inoperative, typically with the notch response inactivated. Once DFE 36 has converged under these conditions, the coefficients representing DFEh can be transferred to feedback filter 28, and the DFE can subsequently be deactivated.

Alternatively, DFEh may be determined while precoder 25 is active together with filters 26, 29 and 39 (in whole or in part). The adaptation process of the DFE in this case operates on the expanded constellation generated by the preceding, rather than on the basic constellation generated by encoder 22. If a training sequence is not used, the convergence problem can be solved using blind equalization techniques known in the art, as described generally, for example, in the above book by Gitlin et al., pages 585–590. Conventional blind equalization, however, assumes that the symbols are uniformly distributed among the constellation points. When preceding is used, as in embodiments of the present invention, the statistical distribution of the expanded constellation points is no longer uniform. Therefore, the characteristics of the precoder are preferably used to determine the distribution of the expanded constellation, which is then used in the blind equalization procedure. DFEh will still converge under these conditions to substantially the same value as that derived above (to within a small difference corrected in final adaptation of the DFE).

Implementation of precoder 25 using equation (5) has the advantage of requiring much simpler hardware than precoders known in the art. The IIR scheme reflected by this equation typically calls for fewer mathematical operations than do FIR schemes, and a FIR generally needs many more taps than an IIR in order to generate an equivalent impulse response, particularly a notch response.

Figure 2:
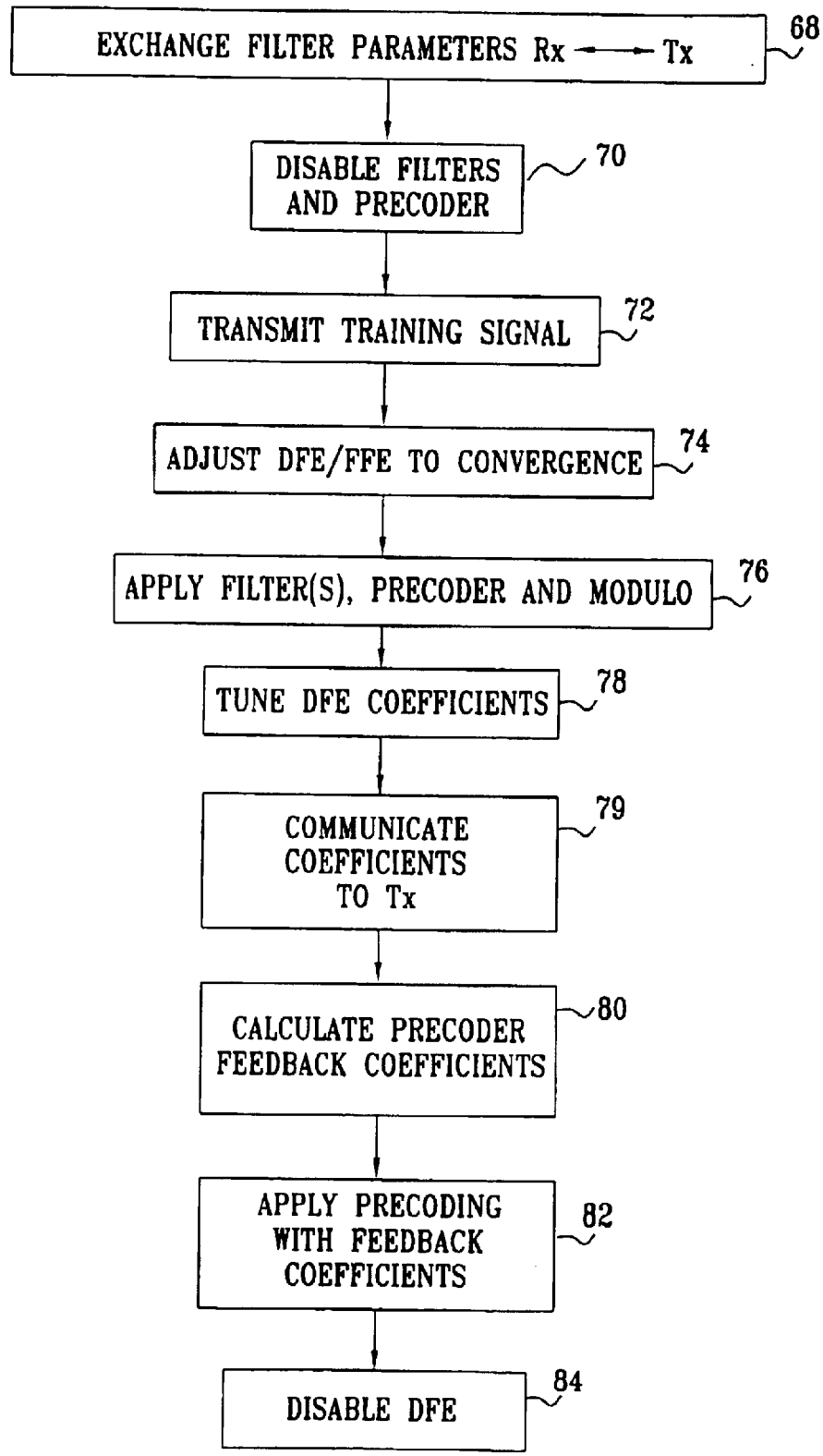
FIG. 2 is a flow chart that schematically illustrate a method for initializing a precoder in the transmitter of FIG. 1, in accordance with a preferred embodiment of the present invention.

FIG. 2 is a flow chart that schematically illustrates a method for adaptively setting the coefficients of feedback filter 28, in accordance with a preferred embodiment of the present invention. Communications between transmitter 20 and receiver 40 begin with an exchange of parameters of filters 26, 29 and 39 between the receiver and transmitter, at a parameter exchange step 68. The receiver parameters are used by the transmitter in setting the coefficients of feedback filter 28. The transmitter parameters can also be used by the receiver, to facilitate adaptation of the elements of equalization and decision block 45, as described, for example, in U.S. patent application Ser. No. 09/521,495, which is assigned to the assignee of the present patent application, and whose disclosure is incorporated herein by reference. Preferably, the parameters of filters 29 and 39, which typically operate at a clock rate higher than the transmitted symbol rate, as mentioned above, are converted to their symbol rate equivalents before they are exchanged. The parameter exchange at step 68 preferably takes place at a low data rate (possibly using a different coding scheme from that used in later communications), with filters 26 and 39 inactive and/or with the transmitter and receiver set so that the transmitted signals do not substantially overlap any designated notches.

An adaptation procedure follows the parameter exchange. For this purpose, the notch elements of digital filters 26, 29 and/or 39 are preferably disabled, at a filter disabling step 70. Precoder 25 is preferably also inoperative at this stage, or at least, filter 28 is disabled. Step 70 is optional, however, and the adaptation procedure may alternatively be carried out while the filters and precoder are operational. As a further alternative, one or more of the Tx and Rx filter elements may be activated initially, while the other element or elements are disabled during the adaptation procedure. Furthermore, feedback filter 28 of precoder 25 may be configured to compensate for only a selected part of the response of filters 26, 29 and 39, with DFE 36 handling any further distortion due to remaining parts of the filter response.

In any case, at a training step 72, transmitter 20 transmits a training signal over channel 30 to receiver 40. The coefficients of FFE 32 and DFE 36 are adjusted adaptively, as is known in the art, while the receiver is receiving the training signal. The adjustment continues until the coefficients have converged, at a convergence step 74.

If the notch elements of filters 26, 28, 29 and 39 were disabled at step 70, in whole or in part, they are turned on, along with precoder 25, at a filter application step 76. Alternatively or additionally, the insertion of filters together with appropriate precoding may be also done during normal operation if required for some external reason. At this point, feedback filter 28 is set only to compensate for the predetermined, known response of filters 26, 29 and 39, as given by equation (3). Preferably, the coefficients of DFE 36 are adaptively readjusted, at an additional tuning step 78. The readjustment compensates for any residual distortion that is induced by filters 26 and 39 and is not cancelled by precoder 25. This residual distortion is generally small.

The values of the readjusted coefficients of DFE 36 are preferably sent back from receiver 40 to transmitter 20, at a coefficient communication step 79. These values are used in calculating final coefficients for feedback filter 28, based on equation (5), at a precoder calculation step 80. Precoder 25 begins to operate using the final coefficients, at a preceding step 82. DFE 36 can now be disabled, at a DFE disablement step 84. Alternatively, only some of the DFE coefficients, preferably the largest of the coefficients, are passed from receiver 40 to feedback filter 28 at step 79. For this purpose, the total DFE response is preferably split into to two sequences—one that stays as part of the DFE and one that is moved to the precoder. In this case, DFE 36 is not disabled, and remains active, with coefficients that are modified so that the overall equalization of the received signal is substantially the same as it was before the coefficients were passed to the feedback filter. In either case, the startup procedure between the transmitter and receiver is thus completed, and normal data communications can go on.

While preferred embodiments are described hereinabove with reference to notch filtering, digital filters 26 and 28 may be used to implement a wide range of other digital filter types. These filters may include both infinite impulse response (IIR) and finite impulse response (FIR) types. In one alternative embodiment, for example, filters 26 and 28 also comprise adaptive digital filters, which are adjusted for the purpose of "water filling," i.e., to shape the output power spectral density of transmitter 20 to optimally match the spectral characteristics of channel 30. Other shaping functions may similarly be implemented, either with or without the additional notch filtering function described herein.

Although preferred embodiments are described herein with particular reference to next-generation, ultra-high speed transmission systems, such as VDSL and HPNA, other applications of the principles of the present invention will be apparent to those skilled in the art. These principles may be adapted for use in substantially any transmitter/receiver pair that communicates by single-carrier modulation. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for conveying digital data from a transmitter to a receiver, comprising:

specifying a spectral filtering profile to be applied in conveying the data;

generating a sequence of input symbols at the transmitter corresponding to the data to be conveyed;

precoding the input symbols at the transmitter using Tomlinson-Harashima precoding responsive to the specified profile, so as to generate a corresponding sequence of precoded symbols;

filtering the precoded symbols in accordance with the specified profile; and decoding the precoded and filtered symbols at the receiver so as to recover the data therefrom.

2. A method according to claim 1, wherein specifying the spectral filtering profile comprises specifying a notch filter to be applied to the precoded symbols.

3. A method according to claim 2, wherein filtering the precoded symbols comprises attenuating radio-frequency signals transmitted by the transmitter in a predetermined frequency band, so as to avoid generating radio frequency interference in that band.

4. A method according to claim 2, wherein filtering the precoded symbols comprises attenuating radio-frequency signals received by the receiver in a predetermined frequency band, so as to reject radio frequency interference received in that band.

5. A method according to claim 1, wherein the specified profile comprises an infinite impulse response filter profile.

6. A method according to claim 1, wherein filtering the precoded symbols comprises filtering the symbols at the transmitter.

7. A method according to claim 6, wherein filtering the symbols comprises filtering the symbols based on predetermined filtering parameters, and comprising communicating the parameters from the transmitter to the receiver for use in processing the symbols at the receiver.

8. A method according to claim 1, wherein filtering the precoded symbols comprises filtering the symbols at the receiver.

9. A method according to claim 8, wherein filtering the symbols comprises filtering the symbols based on predetermined filtering parameters, and comprising communicating the parameters from the receiver to the transmitter for use in preceding the input symbols.

10. A method according to claim 1, wherein generating the sequence of input signals comprises generating the sequence with a given input constellation, and wherein filtering the precoded symbols comprises generating output symbols having an output constellation that is expanded relative to the input constellation.

11. A method according to claim 10, wherein precoding the input symbols comprises applying the Tomlinson-Harashima preceding such that each of the input symbols can be recovered by taking a modulo of a corresponding one of the output symbols.

12. A method according to claim 11, wherein generating the sequence of input symbols comprises generating symbols having real and imaginary parts, and wherein precoding the input symbols comprises preceding both the real and imaginary parts of the input symbols such that both the real and imaginary parts can be recovered by taking a two-dimensional modulo of the real and imaginary parts of the corresponding output symbols.

13. A method according to claim 12, wherein generating the sequence of input symbols comprises generating Quadrature Amplitude Modulation (QAM) symbols.

14. A method according to claim 1, wherein the precoded symbols are conveyed from the transmitter to the receiver over a channel having a channel response, and wherein specifying the spectral profile comprises specifying at least a portion of the profile substantially independently of the channel response.

15. A method according to claim 14, wherein filtering the precoded symbols further comprises optimizing a power spectral density of the conveyed precoded symbols responsive to the channel response.

16. A method according to claim 14, and comprising determining the channel response, wherein preceding the input symbols comprises using the Tomlinson-Harashima preceding responsive to the channel response, as well as to the specified profile.

17. A method according to claim 1, wherein preceding the input symbols comprises:
filtering the sequence of precoded symbols by applying a feedback filter response thereto, so as to generate a corresponding sequence of feedback symbols, wherein the feedback filter response is substantially equal to the filtering profile less a zero-order time-domain component of the profile;
subtracting the feedback symbols from the corresponding input symbols, so as to generate a corresponding sequence of subtracted symbols; and
mapping the subtracted symbols to the corresponding precoded symbols, such that each of the subtracted symbols in the sequence can be recovered by taking a modulo of the corresponding precoded symbol.

18. A method according to claim 17, wherein generating the sequence of input symbols comprises generating Quadrature Amplitude Modulation (QAM) symbols, having respective real and imaginary parts, and wherein mapping the subtracted symbols comprises mapping both real and imaginary parts of the subtracted symbols.

19. A method according to claim 17, wherein specifying the spectral filtering profile comprises specifying a filter response given in the z-dorrain by $A(z)/B(z)$, $A$ and $B$ complex polynomials, and
wherein the precoded symbols are conveyed from the transmitter to the receiver over a channel having a channel response $H(z)$, and
wherein applying the feedback filter comprises applying a filter with a response $F(z)$ given substantially by $F(z)= [(1+z^{-1} \cdot DFEh(z)) \cdot A(z) - B(z)]/B(z)$,
wherein $DFEh(z)$ is an equalizer response of a decision feedback equalizer that is suitable to compensate for the channel response at the receiver.

20. A method according to claim 19, wherein decoding the symbols comprises adaptively determining the response $DFEh(z)$ at the receiver, and wherein applying the filter with the response $F(z)$ comprises conveying an indication of the determined response $DFEh(z)$ to the transmitter for application by the feedback filter.

21. A method according to claim 1, wherein the transmitter transmits Very High Rate Digital Subscriber Line (VDSL) signals to the receiver based on the sequence of precoded symbols.

22. A method according to claim 1, wherein decoding the symbols at the receiver comprises taking a modulo of each of the symbols so as to recover the corresponding input symbol.

23. A method according to claim 22, wherein the receiver receives the symbols from the transmitter over a channel having a given channel response, and wherein decoding the symbols comprises applying a digital equalizer to the symbols so as to compensate for the channel response.

24. A method according to claim 23, wherein applying the digital equalizer comprises adaptively determining equalization coefficients for application by the equalizer responsive to the channel response.

25. A method according to claim 24, and comprising conveying an indication of the adaptively-determined coefficients to the transmitter, wherein preceding the input symbols comprises- adjusting the Tomlinson-Harashima preceding responsive to the indication.

26. A method according to claim 25, wherein decoding the symbols comprises substantially deactivating the digital equalizer after adjusting the preceding.

27. A method according to claim 26, wherein determining the equalization coefficients comprises refraining from filtering the precoded symbols while determining the coefficients.

28. A method according to claim 25, wherein determining the equalization coefficients comprises determining the coefficients while filtering the precoded symbols.

29. A method according to claim 24, wherein generating the sequence of input signals comprises generating the sequence with a given input constellation, and wherein filtering the precoded symbols comprises generating output symbols having an output constellation that is expanded relative to the input constellation, and wherein adaptively determining the equalization coefficients comprises finding a distribution of the output constellation and computing the coefficients responsive to the distribution.

30. A method according to claim 23, wherein applying the digital equalizer comprises applying a forward equalizer and a digital feedback equalizer.

31. A high-speed data transmitter, comprising:
a Tomlinson-Harashima precoder, which is adapted to receive and precode a sequence of input symbols responsive to a specified spectral filtering profile, so as to generate a corresponding sequence of precoded symbols; and
transmit circuitry, which is adapted to process the precoded symbols so as to generate an output signal for transmission over a communication channel to a receiver.

32. A transmitter according to claim 31, wherein the specified spectral filtering profile comprises a notch filter response.

33. A transmitter according to claim 32, wherein the transmit circuitry comprises a digital filter, which is adapted to filter the precoded symbols responsive to the notch filter response.

34. A transmitter according to claim 33, wherein the output signal comprises a radio-frequency signal, and wherein the digital filter is adapted to apply the notch filter response so as to attenuate the radio-frequency signal in a predetermined frequency band, so as to avoid generating radio frequency interference in that band.

35. A transmitter according to claim 31, wherein the transmit circuitry is configured to transmit the output stream over a channel having a channel response, and wherein at least a portion of the profile is specified substantially independently of the channel response.

36. A transmitter according to claim 35, wherein the precoder and transmit circuitry are further configured to optimize an output power spectral density of the transmitter responsive to the channel response.

37. A transmitter according to claim 31, wherein the transmit circuitry is configured to transmit the output signal over a channel having a given channel response, and wherein the precoder is adapted to precode the input symbols responsive to the channel response, as well as to the specified profile.

38. A transmitter according to claim 31, wherein the precoder comprises:
- a feedback digital filter, which is adapted to apply a feedback filter response, based on the specified spectral filtering profile, to the sequence of precoded symbols so as to generate a corresponding sequence of feedback symbols;
- a subtractor, adapted to subtract the feedback symbols from the corresponding input symbols, so as to generate a corresponding sequence of subtracted symbols; and
- a modulo mapping device, adapted to map the subtracted symbols to the corresponding precoded symbols, such that each of the subtracted symbols in the sequence can be recovered by taking a modulo of the corresponding precoded symbol.

39. A transmitter according to claim 38, wherein the symbols comprise Quadrature Amplitude Modulation (QAM) symbols, having respective real and imaginary parts, and wherein the modulo mapping device is adapted to map both the real and imaginary parts of the subtracted symbols.

40. A transmitter according to claim 38, wherein the spectral filtering profile is given in the z-domain by $A(z)/B(z)$, A and B complex polynomials, and
wherein the channel has a channel response $H(z)$, and
wherein the feedback filter response $F(z)$ is given substantially by $F(z)=[(1+z^{-1} \cdot DFEh(z)) \cdot A(z) - B(z)]B(z)$,
wherein $DFEh(z)$ is an equalizer response of a decision feedback equalizer that is suitable to compensate for the channel response at the receiver.

41. A transmitter according to claim 38, wherein the feedback digital filter comprises an infinite impulse response filter.

42. A transmitter according to claim 31, wherein the output signal stream comprises Very High Rate Digital Subscriber Line (VDSL) signals.

43. Apparatus for high-speed data transmission, comprising:
- a transmitter, which comprises:
  - a Tomlinson-Harashima precoder, which is adapted to receive and precode a sequence of input symbols responsive to a specified spectral filtering profile, so as to generate a corresponding sequence of precoded symbols; and
  - transmit circuitry, which is adapted to process the precoded symbols so as to generate an output signal for transmission over a communication channel; and
- a receiver, adapted to receive the output signal from the transmitter over the channel, and comprising:
  - receive circuitry, which is adapted to process the received output signal, so as to generate a stream of output samples;
  - a decision block, adapted to process the stream of output samples so as to recover a sequence of output symbols; and
  - a modulo reduction device, adapted to take a modulo of each of the recovered output symbols so as to regenerate the input symbols.

44. Apparatus according to claim 43, wherein the specified spectral filtering profile comprises a notch filter response.

45. Apparatus according to claim 43, wherein at least one of the transmit circuitry and the receive circuitry comprises a digital filter, which is adapted to apply the specified filtering profile to the signal.

46. Apparatus according to claim 45, wherein the digital filter comprises a transmit digital filter in the transmit circuitry and a receive digital filter in the receive circuitry, which are together adapted to apply the specified filtering profile.

47. Apparatus according to claim 45, wherein the digital filter comprises a transmit digital filter in the transmit circuitry, the filter having filter parameters, and wherein the transmitter is adapted to transmit the filter parameters to the receiver for use in processing the output samples.

48. Apparatus according to claim 45, wherein the digital filter comprises a receive digital filter in the receive circuitry, the filter having filter parameters, and wherein the receiver is adapted to transmit the filter parameters to the transmitter for use in preceding the input symbols.

49. Apparatus according to claim 43, wherein the communication channel has a channel response, and wherein at least a portion of the profile is specified substantially independently of the channel response.

50. Apparatus according to claim 43, wherein the communication channel has a channel response, and wherein the precoder is adapted to precode the input symbols responsive to the channel response, as well as to the specified filtering profile.

51. Apparatus according to claim 43, wherein the output signal comprises a Very High Rate Digital Subscriber Line (VDSL) signal.

52. Apparatus according to claim 43, wherein the precoder comprises:
- a feedback digital filter, which is adapted to apply a feedback filter response, based on the specified spectral filtering profile, to the sequence of precoded symbols so as to generate a corresponding sequence of feedback symbols;
- a subtractor, adapted to subtract the feedback symbols from the corresponding input symbols, so as to generate a corresponding sequence of subtracted symbols; and
- a modulo mapping device, adapted to map the subtracted symbols to the corresponding precoded symbols, such that each of the subtracted symbols in the sequence can be recovered by taking a modulo of the corresponding precoded symbol.

53. Apparatus according to claim 52, wherein the feedback digital filter comprises an infinite impulse response filter.

54. Apparatus according to claim 52, wherein the spectral filtering profile is given in the z-domain by $A(z)/B(z)$, A and B complex polynomials, and
wherein the channel has a channel response $H(z)$, and
wherein the feedback filter response $F(z)$ is given substantially by $F(z)=[(1+Z^{-1} \cdot DFEh(z)) \cdot A(z) - B(z)]/B(z)$,
wherein $DFEh(z)$ is an equalizer response of a decision feedback equalizer that is suitable to compensate for the channel response at the receiver.

55. Apparatus according to claim 54, wherein the decision feedback equalizer is comprised in the decision block of the receiver and is configured to adaptively determine the response $DFEh(z)$, and wherein the receiver is adapted to convey to the transmitter an indication of the determined response $DFEh(z)$ for application by the feedback filter.

56. Apparatus according to claim 52, wherein the decision block comprises:
- a decision feedback equalizer, which is configured to apply decision feedback filtering to the recovered sequence of output symbols, so as to generate a corresponding sequence of decision feedback symbols;

a forward filter equalizer, which is configured to apply forward equalization to the stream of output samples so as to generate a sequence of forward-equalized symbols;

an adder, adapted to add the decision feedback symbols to the forward-equalized symbols to generate a corresponding sequence of corrected symbols; and an extended slicer, adapted to assign each of the corrected symbols to a corresponding value in a constellation of the output symbols.

57. Apparatus according to claim 56, wherein the decision feedback equalizer comprises an adaptive equalizer, having equalization coefficients determined adaptively responsive to the channel response.

58. Apparatus according to claim 57, wherein the receiver is adapted to convey to the transmitter an indication of the equalization coefficients, responsive to which the feedback filter response is determined so that the precoder precodes the input symbols based on the channel response, as well as on the specified profile.

59. Apparatus according to claim 58, wherein after the indication of the equalization coefficients is conveyed to the transmitter, the decision feedback equalizer is substantially disabled.

* * * * *